US005557913A

United States Patent [19]
Metz

[11] Patent Number: 5,557,913
[45] Date of Patent: Sep. 24, 1996

[54] BELT MOWER

[76] Inventor: Donald L. Metz, 6311 Fly Rd., Suite A, East Syracuse, N.Y. 13057

[21] Appl. No.: 393,489

[22] Filed: Feb. 24, 1995

[51] Int. Cl.[6] .................................................. A01D 34/83
[52] U.S. Cl. .............................. 56/244; 56/12.4; 56/291; 56/DIG. 10
[58] Field of Search ................................... 56/11.6, 12.4, 56/244, 290, 291, 292, DIG. 3, DIG. 10

[56] References Cited

U.S. PATENT DOCUMENTS

| | | | |
|---|---|---|---|
| 3,093,170 | 6/1963 | Thayer | 56/290 X |
| 3,397,524 | 8/1968 | Hofer | 56/290 X |
| 4,030,276 | 6/1977 | Stecklein | 56/291 |
| 5,398,490 | 3/1995 | Allen | 56/244 |

*Primary Examiner*—Terry Lee Melius
*Attorney, Agent, or Firm*—Sughrue, Mion, Zinn, Macpeak & Seas

[57] ABSTRACT

A lawn mower includes an elongated downwardly open housing having an endless belt entrained therein about a pair of pulleys mounted at opposite ends of the housing. A plurality of C-shaped, channel-like blades are mounted transversely on the outer surface of the belt to cut the lawn as the housing is moved across the lawn on a plurality of rollers. The housing is divided into a plurality of sections which are pivotally interconnected so that the housing sections may pivot relative to each other due to uneven ground. Guide brackets are provided within the housing to maintain the opposed reaches of the belt parallel to each other during such pivoting of the sections.

4 Claims, 6 Drawing Sheets

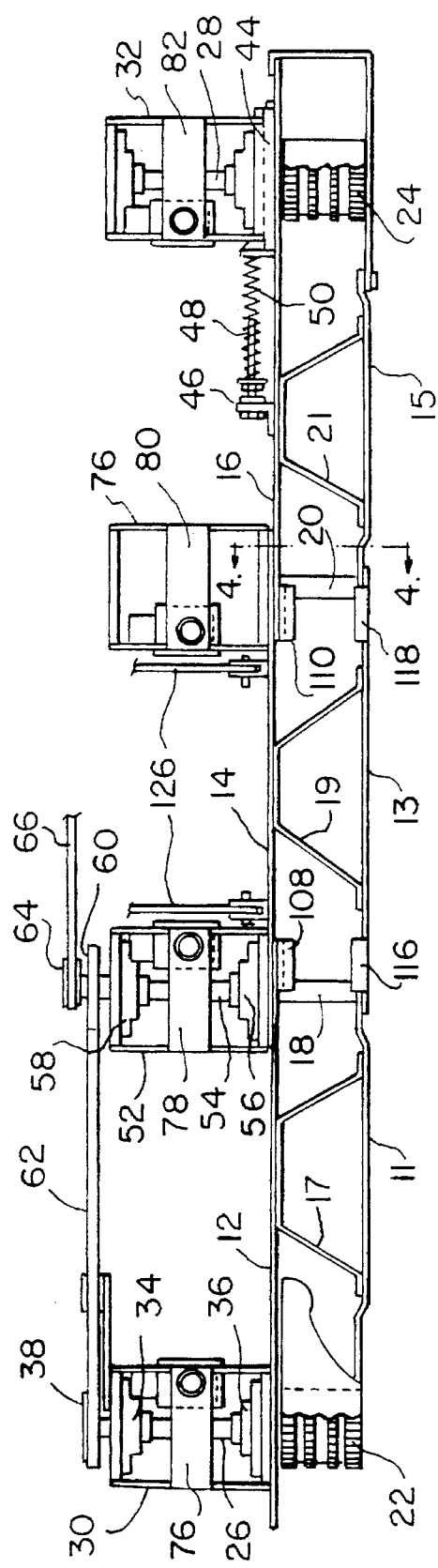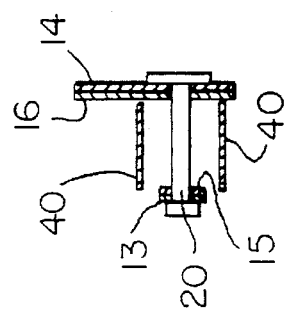
FIG. 3
FIG. 4

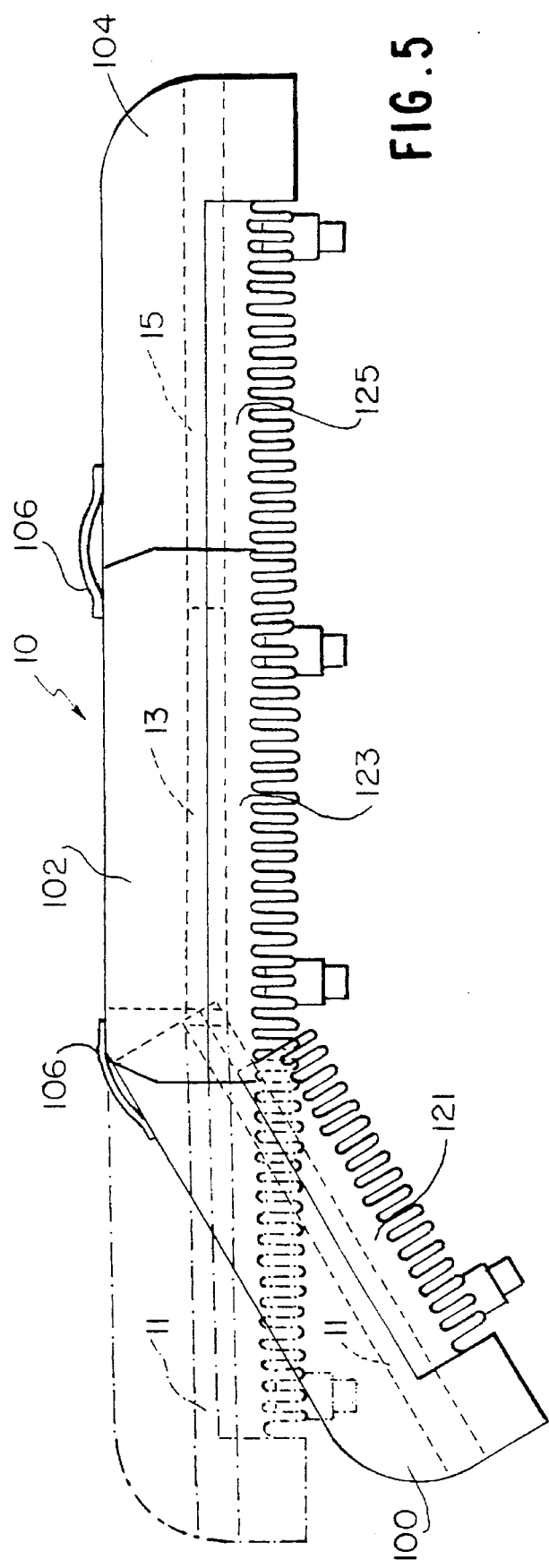
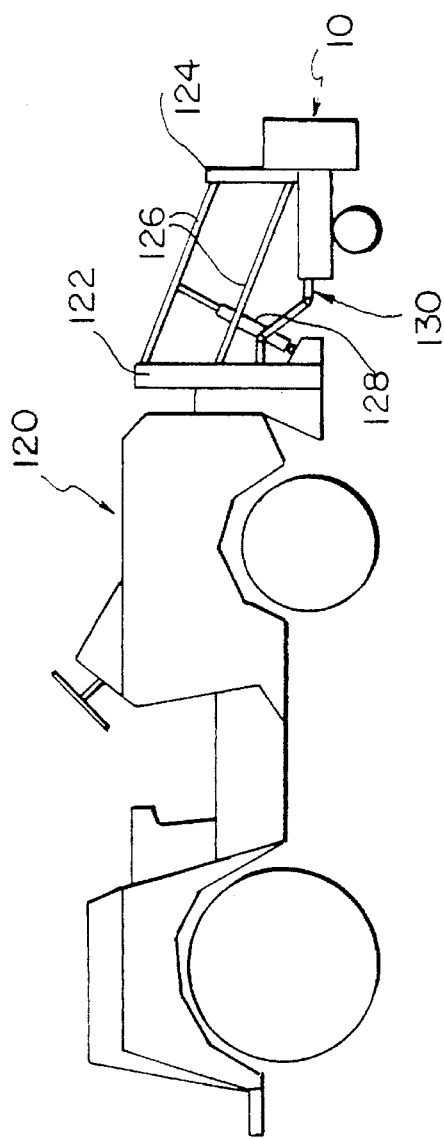
FIG. 5
FIG. 6

BELT MOWER

BACKGROUND OF THE INVENTION

The present invention is directed to a belt mower and more specifically to an articulated belt mower adapted to be powered by a tractor or a walk behind unit wherein a plurality of curved blades are mounted in spaced relation on an endless belt travelling in a direction perpendicular to the movement of the power unit.

For many years, the most common type of mower was the well known reel type mower comprised of a plurality of spiral blades mounted for rotation about a common axis which cooperated with a fixed straight blade extending parallel to the axis. The reel type mower provided a very good straight line cut but could not cut all types of grasses or weeds and needed continual adjustment and sharpening.

With the advent of power driven mowers, the rotary mower became popular. However, the rotary mower cuts in one or more circular patterns resulting in the twisting of the grass thereby causing split tops and different patterns of cut for an uneven look. Furthermore, even by using a plurality of rotary blades, the cutting width of the deck was limited since the deck was inflexible and was not able to contour to uneven terrain. This created a limitation of the types of cutting which could be done with a rotary mower. Conventional rotary mowers also required substantial horse power due to the use of large heavy steel blades.

Although endless belt-type mowers never became popular, several patents were granted on this type of mower. Hackerott, U.S. Pat. No. 2,514,861 is directed to a power lawn mower having an endless belt and a plurality of cutter blades secured thereto. The cutter blades extend perpendicular from the planar service of the belt with the belt operating in a horizontal plane. A similar type mower is disclosed in the Miner U.S. Pat. No. 2,744,376).

Fralish U.S. Pat. No. 4,418,519) discloses an endless chain-type lawn mower wherein the endless belts are placed is a substantially horizontal plane. Fralish utilizes two parallel belts having pivot pins connected therebetween upon which a plurality of plastic whip sticks are mounted for cutting the grass.

Matthews U.S. Pat. No. 3,488,931) discloses a mowing machine having an endless chain disposed for operation in a substantially vertical plane. The cutting blades extend forwardly of the chain in the plane of the chain.

Hurlburt U.S. Pat. No. 3,72,195), Johnson U.S. Pat. No. 2,948,099) and Templeton U.S. Pat. No. 2,543,386) are all directed to harvesting machines having a cutter bar or a cutter head with an endless belt or chain entrained about the cutter bar or head for rotation in a substantially horizontal plane. The blade members protrude outwardly in the plane of the rotating chain or belt.

SUMMARY OF THE INVENTION

The present invention is directed to a new and improved mower utilizing an endless flexible belt having a plurality of cutting blades mounted thereon wherein the belt is mounted about a plurality of pulleys and an articulated housing which readily conforms to variations in the terrain.

The present invention provides a new and improved mower which will provide a more uniform cut with no scalping and which only requires reduced horse power as compared with a rotary mower. As a result, the belt mower is very efficient and produces very little noise. The blade configuration produces good air flow for maximum grass lift, discharge and mulching capability. The belt mower may readily be mounted underneath or in front of a tractor or can be powered by a walk behind unit giving good maneuverability while having a wide cutting width.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 3 is a top plan view of the mower.

FIG. 4 is a sectional view taken along the line 4—4 in FIG. 3.

FIG. 5 is a front elevational view with the front and top guards in position.

FIG. 6 is a schematic view showing the mower mounted on the front of a tractor.

DETAILED DESCRIPTION OF THE INVENTION

Figure 1:
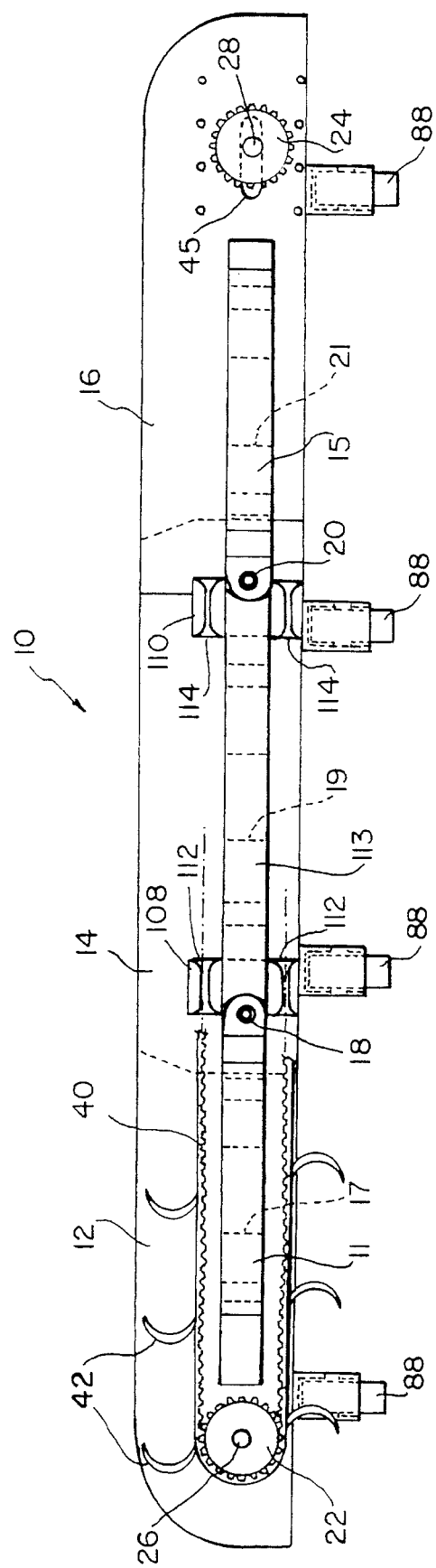
FIG. 1 is a front elevational view of the mower according to the present invention with the front and top guard plates removed.

The belt mower 10 as shown in FIG. 1 is comprised of an elongated housing open at the bottom and having an endless belt entrained about a pair of pulleys in the housing with a plurality of spaced apart transversely extending curved blades mounted on the belt for cutting grass in a direction transverse to the movement of the mower which would be perpendicular to the paper as viewed in FIG. 1.

In FIG. 1 however, the top and front shrouds have been removed to more clearly illustrate the arrangement of the belt and blades within the housing.

The mower is comprised of three rear support plates 12, 14 and 16 which are pivotally connected by means of pivot pins 18 and 20.

Three front support plates 11, 13 and 15 of narrower width than the rear support plates are connected to the rear support plates 12, 14 and 16, respectively, by brackets 17, 19 and 21, respectively by welding or any other suitable arrangement depending on the materials used. The front plates are pivotally connected by the same pins 18 and 20 which pivotally connect the rear plates.

A drive pulley 22 and a driven pulley 24 are rotatably mounted by means of shafts 26 and 28, respectively which extend through the support plates 12 and 16, respectively and are supported for rotation in bearing assemblies 30 and 32, respectively. An endless belt 40 is entrained about the pulleys 22 and 24 and a plurality of cutting blades 42 are secured in spaced apart relation on the outer surface of the belt 40.

Figure 2:
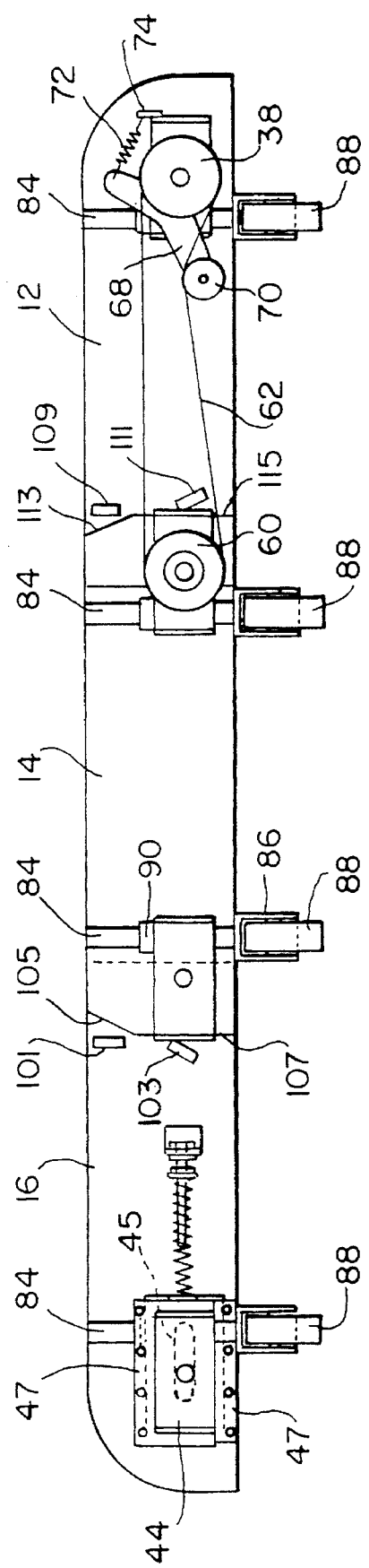
FIG. 2 is a rear elevational view of the mower.

The bearing assembly 30 is fixedly secured to the rear surface of the support plate 12 and the shaft 26 is rotatably supported in bearings 34 and 36 within the bearing assembly 30. The end of the shaft 26, opposite the end carrying the pulley 22, carries a pulley 38. The bearing assembly 32 is substantially identical to the bearing assembly 30 but is mounted on a plate 44 which is slidably mounted on the rear surface of the support plate 16 by means of a pair of gibbs 47 as shown in FIG. 2 and 3. Thus the bearing assembly 32 and the shaft 28 upon which the pulley 24 is mounted, are movable as a unit in order to tension the endless belt. The shaft 28 extends through an elongated slot 45 in the support plate 16 since the pulley 24 can shift as much as 2 ⅛" upon pivotal movement of the support plates 12 and 16 relative to support plate 14. An abutment 46 is mounted on the rear surface of the support plate 16 and carries a guide bolt 48. A spring 50 is mounted on the guide bolt 48 and extends between the abutment 46 and the slidable plate 44 for normally biasing the bearing assembly 32 toward the end of the housing for tensioning the belt at all times during relative pivotal movement of the support plates.

A third bearing assembly 52 is fixedly mounted on the rear surface of the support plate 14. A shaft 54 is rotatably mounted by means of bearings 56 and 58. The shaft 54 is in axial alignment with the pivot pin 18 and one end of the shaft 54 extends rearwardly of the bearing assembly 52 and carries a pulley 60. A drive belt 62 is entrained about the pulley 60 and pulley 38. A smaller pulley 64 is also mounted on the end of the shaft 54 and carries a drive belt 66 which may be connected to a suitable power source. A belt tensioner is provided for the belt 62 in the form of a lever 68 pivotally mounted on the end of the bearing assembly 30. A roller or pulley 70 is rotatably mounted on one end of the lever and maintained in engagement with the outer surface of the belt 62. A spring 72 is connected between the opposite end of the lever 68 and a fixed abutment 74 on the bearing assembly for normally biasing the roller 70 into tensioning engagement with the belt 62.

Figure 7:
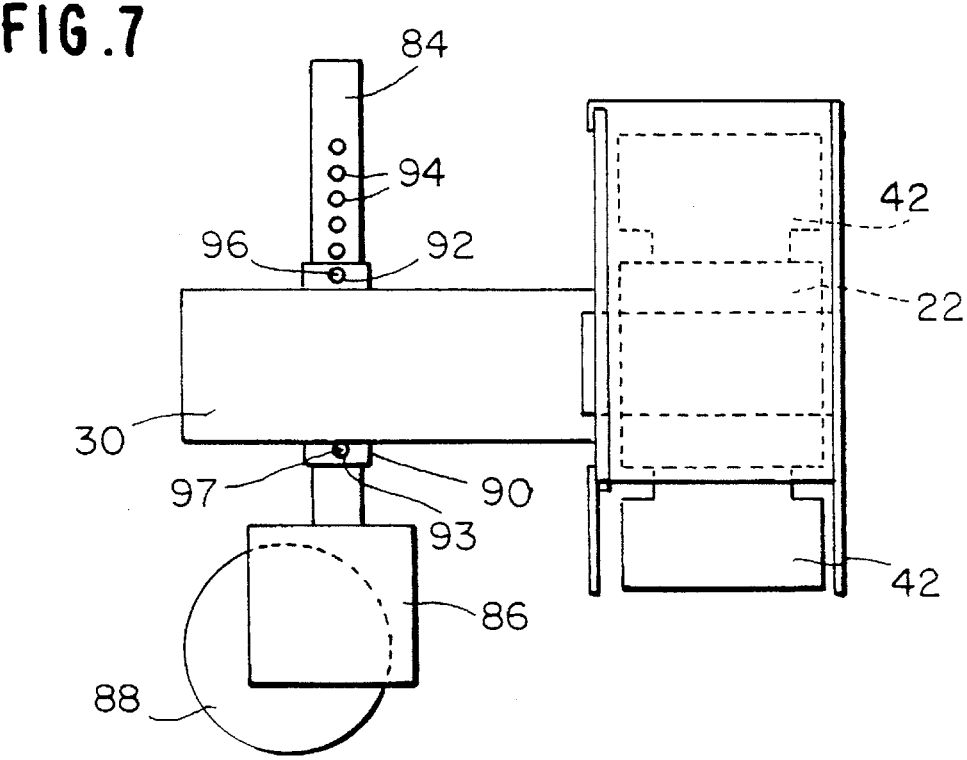
FIG. 7 is a side elevation view of the mower as viewed from the left side in FIG. 3 with the drive means removed.
Figure 8:
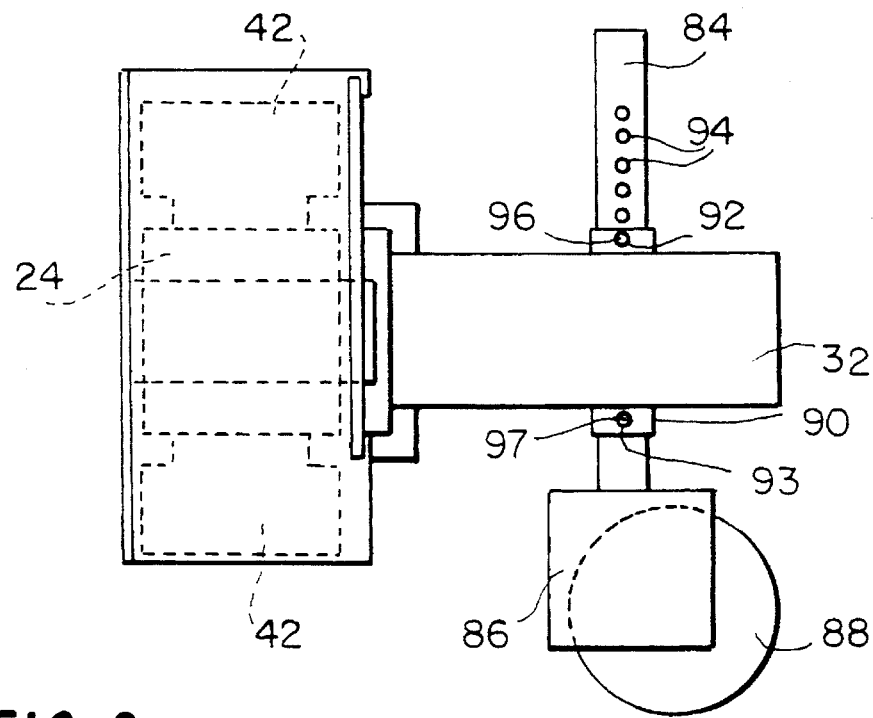
FIG. 8 is a side elevation view of the mower as viewed from the right side in FIG. 3.

A support assembly 76 is also fixedly mounted on the rear surface of the support plate 14 in alignment with the pivot shaft 20. Support blocks 76, 78, 80 and 82 are mounted in the three bearing assemblies 30, 32 and 52 and the support assembly 76. Each of the support blocks is provided with a vertically extending aperture through which the shank 84 of a wheel assembly is slidably mounted. The shank 84 is connected to a U-shaped housing 86 and wheel 88 is rotatably supported within the U-shaped housing by means of a shaft (not shown). A bearing sleeve 90 is slidably mounted in each support block and surrounds each shank 84. As seen in FIG. 7, a pair of holes 92 and 93 extends through the sleeve above and below the support block and a plurality of holes 94 extend through the shank 84. Pins 96 and 97 extend through the holes 92 and 93 and the selected aligned holes 94 to restrain the sleeve in the support block and adjustably support the wheel at the desired height. Thus the wheel can swivel freely relative to the support block.

The mower unit 10 as shown in FIG. 5, is provided with a top and front shroud comprised of three pieces 100, 102 and 104 which are detachably secured to the front support plates 11, 13 and 15, respectively by means of nuts and bolts (not shown). The combs 121, 123 and 125 are also detachably secured to the front support plates 11, 13 and 15, respectively. The two end units comprised of the support plates 12 and 16 and the components attached thereto may be pivoted relative to the center unit comprised of the support plate 14 and the components attached thereto at an angle up to approximately 30 degrees as shown in FIG. 5. A pair of lugs 101 and 103 are secured to the rear support plate 16 and engage the end surfaces 105 and 107 of the rear support plate 14 to limit the pivotal movement of the plate 16 relative to the plate 14 in opposite directions. Similar lugs 109 and 111 are mounted on the rear support plate 12 for engagement with the end surfaces 113 and 115 of the rear support plate 14 for the same purpose.

A pair of wide straps 106 having a width substantially equal to the width of the housing are secured to the housings in overlapping relationship to the joints between the center unit and the end units as viewed in FIG. 5. This will provide coverage for any opening which might occur due to the pivoting of one unit relative to the other.

In order to properly guide the belt 40 during the pivotal movement of one unit relative to the other, a pair of belt guides 108 and 110 are mounted on the center support plate 14 adjacent each pivot pin 18 and 20, respectively. Each belt guide is provided with pivot slots 112 and 114 for guiding one edge of the belt 40. A pair of opposed belt guides 116 and 118 are mounted on a plate 13 and are provided with grooves (not shown) identical to the grooves 112 and 114 provided in the brackets 108 and 110. Thus the opposite edges of the belt 40 will be guided in the slots in the brackets 108, 100, 116 and 118. Since the ends of the slots are disposed in substantial alignment with the center of the pivot pins 18 and 20, the reaches of the belt 40 between the brackets and the end pulleys will be maintained in parallel relationship to each other without contacting any other structural elements and the cutting blades will be maintained in proper spaced relation relative to the housing or shroud.

By way of example, the mower 10 is shown in FIG. 6 as being mounted on the front end of a conventional lawn tractor 120. A first bracket 122 may be mounted on the front of the tractor 120 and a second bracket 124 may be mounted on the mower 10. The two brackets may be pivotally interconnected by a plurality of rods 126 to form a parallelogram and a conventional hydraulic cylinder 128 may be used to raise and lower the rods 126 and the mower attached thereto. A power take-off unit shown schematically at 130 may be provided for powering the mower from the engine of the lawn tractor. Although it is not shown, it is obvious that the mower 10 could also be mounted on the front end of a self-propelled power source. Typical drive means could be provided between the power source and the mower. As shown in FIG. 3, a belt drive 66 has been provided for connecting a source of power (not shown) to the drive pulleys 64 and 38 to drive the belt 40. However, any conventional direct drive could be substituted for the belt drive 66.

Figure 9:
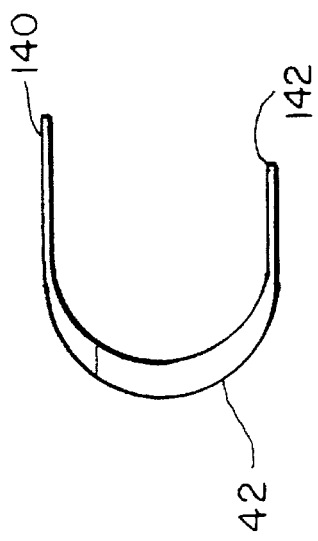
FIG. 9 is a side elevation view of a cutting blade, per se.
Figure 11:
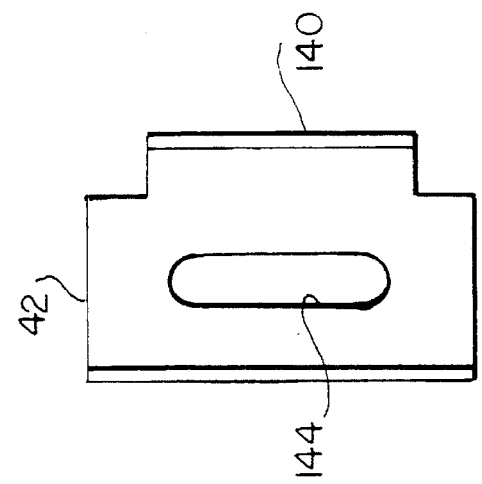
FIG. 11 is a right side elevational view of the cutter blade as viewed in FIG. 9.
Figure 10:
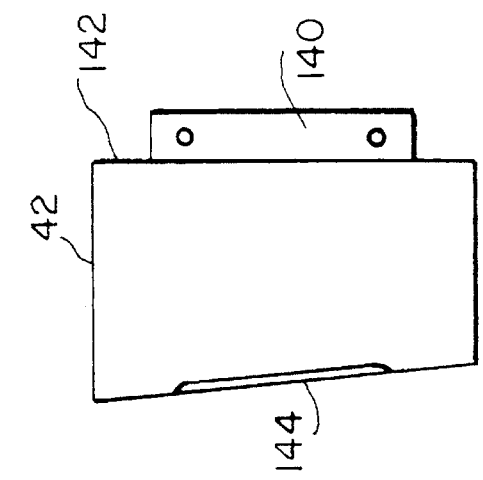
FIG. 10 is a bottom plan view of the blade shown in FIG. 9.

The construction of a blade 42 is shown in greater detail in FIGS. 9–11 inclusive. The blade is shown in side elevation in FIG. 9 and is provided with a bracket 140 for attachment to the belt by means of nuts and bolts. It is also feasible to use any other types of detachable fastener arrangement whereby the blades can readily be replaced on the belt 40. The blade 42 has a substantially C-shaped configuration as best seen in FIG. 9 with the cutting edge 142 being disposed at the opposite end of the blade from the bracket 140. The bight of the blade is angled relative to the cutting edge 142 and when mounted on the belt, will be angled to provide a rear discharge of grass clippings from the curved blade. The bight of the blade 42 is provided with a horizontal slot 144 which allows the passage of a limited amount of grass clippings for engagement and additional cutting by the next blade on the belt, thereby providing a mulching action. The blades are preferably made of steel but can be made of any other metal or plastic material depending upon the type of cutting being done.

The belt upon which the blades are mounted may be of reinforced rubber but also could be made of any other suitable material conventionally used in belt constructions.

The various components of the mower, including the support plates, brackets, pulleys and the like are all preferably made of a metal material, but plastic or any other type of material which provides sufficient strength for the purpose can be used.

In lieu of the curved blades as shown, the blades could be flat and secured on bosses which could be integrally molded with the belt or secured on the outer surface of the belt. The flat blades would extend parallel to the surface of the belt in the direction of travel.

Although the mower has been shown and described as being comprised of three articulated housings, the number could be larger or smaller.

While the invention has been particularly shown and described with reference to preferred embodiments thereof, it will be understood by those in the art that the foregoing and other changes in form and details may be made therein without departing from the spirit and scope of the invention.

What is claimed is:

1. A mower comprising elongated, downwardly open housing means, a pair of pulleys mounted in said housing means at opposite ends thereof for rotation about a pair of horizontally disposed axes, respectively, an endless belt entrained about said pulleys, a plurality of cutting elements mounted on an outer surface of said belt, drive means connected to at least one of said pulleys for driving said belt and adjustable rotatable means connected to said housing means for supporting said housing means on the ground for movement along the ground in spaced relation thereto, wherein said housing means is comprised of a plurality of sections and horizontally disposed pivot means pivotally interconnecting said sections whereby said sections may pivot relative to each other in response to uneven ground.

2. A mower as set forth in claim 1, further comprising belt guide means mounted in said housing means for engaging said belt to maintain opposed reaches of said belt parallel to each other upon pivotal movement of said sections of said housing means.

3. A mower as set forth in claim 1, wherein each of said cutting elements is comprised of a curved channel-shaped blade having a substantially C-shaped cross section with a first edge thereof connected to said belt and a second edge provided with a cutting edge extending transversely of the belt in parallel spaced relation thereto.

4. A mower as set forth in claim 3, wherein a curved blade has an opening therein for allowing passage of clippings to a following blade for mulching and wherein said curved blade is angled relative to said cutting edge to provide a rear discharge as well as an end discharge from said housing means.

\* \* \* \* \*